(12) United States Patent
Hu

(10) Patent No.: US 6,366,900 B1
(45) Date of Patent: Apr. 2, 2002

(54) METHOD FOR ANALYZING THE CONDITIONAL STATUS OF SPECIALIZED FILES

(75) Inventor: Johnny Hu, Irvine, CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/359,998

(22) Filed: Jul. 23, 1999

(51) Int. Cl.7 ............................................. G06F 17/30
(52) U.S. Cl. ......................... 707/1; 707/100; 707/102; 707/500
(58) Field of Search ........................... 707/1, 100, 500, 707/102

(56) References Cited

U.S. PATENT DOCUMENTS

| | | | | |
|---|---|---|---|---|
| 5,432,930 A | * | 7/1995 | Song | 707/1 |
| 5,668,960 A | * | 9/1997 | Kataoka | 707/1 |
| 5,799,184 A | * | 8/1998 | Fulton et al. | 707/2 |
| 6,201,902 B1 | * | 3/2001 | Sasaki et al. | 382/309 |

* cited by examiner

*Primary Examiner*—Jean M. Corrielus
(74) *Attorney, Agent, or Firm*—Alfred W. Kozak; Mark T. Starr; Lise A. Rode

(57) ABSTRACT

A specialized file organization has data files organized in named blocks of data files and index files organized in a tree structure of hierarchical nodes. A sequential method is provided for analyzing the current utilization of the blocks of data files and the index file structure of the index files to determine whether the User should restructure the files.

7 Claims, 6 Drawing Sheets

UNBALANCED B-TREE:INDEX FILE

AN UNSTRUCTURED INDEX FILE WILL HAVE MANY LEVELS OF COARSE TABLES AND MANY EMPTY SLOTS IN THE FINE TABLES.

BALANCED TREE:INDEXED FILE

THE BALANCED INDEX FILE (WHEN RESTRUCTURED) WILL ELIMINATE THE COARSE TABLES AND EVENLY DISTRIBUTE THE FINE TABLES.

Restructuring a Data file

| DATA    | DELETED | DELETED | DATA    |
|---------|---------|---------|---------|
| DELETED | DATA    | DATA    | DELETED |
| DATA    | DATA    | DELETED | DATA    |
| DELETED | DATA    | DELETED | DATA    |

Fig. 2A : Data-Unstructured File

| DATA | DATA | DATA |
|------|------|------|
| DATA | DATA | DATA |
| DATA | DATA | DATA |

Fig. 2B: Data-Restructured File

UNBALANCED B-TREE:INDEX FILE

AN UNSTRUCTURED INDEX FILE WILL HAVE MANY LEVELS OF COARSE TABLES AND MANY EMPTY SLOTS IN THE FINE TABLES.

---

BALANCED TREE:INDEXED FILE

THE BALANCED INDEX FILE (WHEN RESTRUCTURED) WILL ELIMINATE THE COARSE TABLES AND EVENLY DISTRIBUTE THE FINE TABLES.

METHOD FOR ANALYZING THE CONDITIONAL STATUS OF SPECIALIZED FILES

CROSS REFERENCES TO RELATED APPLICATIONS

This application is related to a co-pending U.S. application Ser. No. 09/322,535 entitled "Multi-Processor System For Database Management" and which is incorporated herein by reference.

FIELD OF THE INVENTION

This disclosure relates to means for analyzing specialized data and index files of KEYEDIOII Data Management System Software for more efficient usage.

BACKGROUND OF THE INVENTION

The operational factors of the present method involve the KEYEDIOII software. This software is the Unisys Indexed Sequential Access Method (ISAM) software for COBOL 74 and for Report Program Generator (RPG) programming languages.

KEYEDIOII is a data management system (DMS II) based product developed to take advantage of certain of the DMS II features in order to achieve better performance for KEYEDIO users.

Table A-1 is an example of the Block 0 Format used for data files. The KEYEDIOII data file is declared with MAXRECSIZE equal thirty words and Block Size equal thirty words. There are logical blocks which exist within the file. The logical block size of a file is a minimum of 120 words or the user-declared block size translated into words. Records are always one word greater than the size of the user-declared record translated into words. When an existing KEYEDIOII file is opened, the user file declaration MAXRECSIZE is corrected to the original user MAXRECSIZE declaration instead of the thirty-word physical size.

Because logical block 0 of the data file is always reserved, the user record 0 is actually located in the first record of block 1. The last word of each record (hidden word) contains either the user logical-record number (starting with 0) or else all bits turned on, which indicates a deleted record.

TABLE A-1

Block 0 Format

| Word | Bits | Field Name | Description |
|---|---|---|---|
| Word 0 | [47:01] | CHKSUMMED | Check digit calculation on all blocks |
|  | [46:01] | ADDRESSCHECKED | Address checking on all blocks |
|  | [45:01] | SETDIRECTORYEXISTS | User-specified index file titles |
|  | [39:08] | BUFFS | Original BUFFERS declaration |
|  | [31:16] | MAXRECSIZE | KEYEDIOII record length in words (including hidden word) |
|  | [15:16] | BLKSZ | KEYEDIO block size in words |
| Word 1 | [47:48] | FILEFORMATLEVEL | Format level equals 3 |
| Word 2 | [47:48] | TABLESIZE | Block size in words of index files |
| Word 3 | [47:48] | SAVEDMINRECSIZE | User-declared MINRECSIZE |
| Word 4 | [47:48] | SAVEDMAXRECSIZE | User-declared MAXRECSIZE |
| Word 5 | [47:48] | SAVEDBLOCKSIZE | User-declared BLOCKSIZE |
| Word 6 | [47:48] | SAVEDFRAMESIZE | User-declared FRAMESIZE |
| Word 7 | [47:48] | SAVEDBLOCKSTRUCTURE | User-declared BLOCKSTRUCTURE |
| Word 8 | [47:48] | SAVEDUNITS | User-declared UNITS |
| Word 9 | [47:48] | SAVEDEXTMODE | User-declared EXTMODE |
| Word 10 | [47:48] | END_OF_FILE | Number of user-records |
| Word 11 | [47:48] | ALLOCATION | Allocation limit |
| Word 12 | [47:48] | RESTART_AFN | Audit-file number before Halt/Load |
| Word 13 | [47:48] | RESTART_ABN | Audit block last check point |
| Word 14 | [47:08] | RESTART_STR | Structure number before Halt/Load |
| Word 15 | [47:08] | RESTART_SIBINX | SIBINX before Halt/Load |
| Word 16 |  |  | Available to user |
| Word 17 |  |  | Available to user |
| Word 18 |  |  | Available to user |
| Word 19 |  |  | Available to user |
| Word 20 |  |  | Available to user |
| Word 21 | [47:48] | SAVEDAREASIZE | User-declared AREASIZE |
| Word 22 | [47:48] | FILEINFOSZLOC | SIZE word location for FILEINFO array (normally 30). FILEINFO array follows SIZE word |
| Word 23 | [47:48] | ACLINFOWORD | User-declared ACLINFO |
| Word 24 | [47:48] | RECORDLOCKING | User-declared RECORDLEVELLOCK |
| Word 25 |  |  | Available to user |

TABLE A-1-continued

Block 0 Format

| Word | Bits | Field Name | Description |
|---|---|---|---|
| Word 26 | | | Available to user |
| Word 27 | | | Available to user |
| Word 28 | | | Available to user |
| Word 29 | | | Available to user |
| Word 30 | [47:48] | FILEINFOSZ | Size of FILEINFO array |
| Word 31 | | FILEINFO | Start of FILEINFO array |
| Word n | | FILEINFO | Last word of FILEINFO array-see Note 1. |
| Word n + 1 | | SETDIRECTORYWORDS | Parallel array to FILEINFO. Contains directory words for non-default index file titles-refer to Table A-2. |
| Word m | | SETDIRECTORYWORDS | Last word of SETDIRECTORYWORDS array-see Note 2. |
| Word m + 1 | | | Text for non-default titles |

Note 1:
The following formula is used for determining the bit size for word n:
n = 31 + FILEINFOSZ − 1
Note 2:
The following formula is used for determining the bit size for word m:
m = 31 + FILEINFOSZ * 2 − 1

TABLE A-2

FILEINFOSZ Array Details

| Word | Bits | Field Name | Description |
|---|---|---|---|
| SETDIRECTORY Word | [47:01] | NAMEONLY | Non-default FILENAMEONLY |
| | [46:01] | PACKONLY | Non-default PACKNAMEONLY |
| | [35:12] | KEYNUM | Key number used in title |
| | [23:12] | DIRENTSZ | Size in words of non-default part |
| | [11:12] | DIRENTOFF | Block 0 offset of non-default part |

There is a Block 0 Format for index Files: Table B-1 is an illustration of the Block 0 Format for the index Files. The physical MAXRECSIZE and the Block Size for the Index Files are thirty words. Logical Block Size is currently defined to be 900 words. The data files have the table logical Block Size stored in a field called the TABSIZE field of block 0.

TABLE B-1

Block 0 Format for Index Files

| Word | Bit | Attribute | Description |
|---|---|---|---|
| Word 0 through Word 29 | | | As per DMSII index sequential sets |
| Word 30 | [47:48] | SSET_RESTART_STR | Structure number before Halt/Load |
| Word 31 | [47:48] | DS_TITLE_DIR | Data set title directory word (see data file set directory words) |
| Word 32 | [47:48] | SET_FILEINFOSZ | Size of a set FILEINFO array |

TABLE B-1-continued

Block 0 Format for Index Files

| Word | Bit | Attribute | Description |
|---|---|---|---|
| Word n | | FILEINFO | Make FILEINFO array to describe index keys-see the note following this table. For group key indexes, field contains group sub-key descriptions (up to 30) |
| Word n + 1 | | SETFILEINFOSZ | Text for data file title |

Note:
The following formula is used for determining the bit size for Word n:
n = 32 + SETFILEINFOSZ − 1

KEYEDIOII is an Indexed Sequential Access Method (ISAM) software for COBOL 74 and Report Program Generator (RPG) programming languages.

KEYEDIOII support is provided by an initialized system library. The function name is KEYEDIOIISUPPORT and a library code file is named SYSTEM/KEYEDIOII. A conversion is required to change KEYEDIO files (earlier version) to KEYEDIOII files, however, both types of these files can coexist. When a KEYEDIO file is accessed, it connects to the KEYEDIOSUPPORT function; when a KEYEDIOII file is accessed, it connects to the KEYEDIOII support function. In either case, the compiler to the support-library interface is identical, so that user programs need not be recompiled to create an access KEYEDIOII file.
KEYEDIOII Software Files
These software files consist of four code files and three symbol files, which will be designated with the letter "c" for code and "s" for symbol.
The code files are: (c1) SYSTEM/KEYEDIOII; (c2) SYSTEM/KEYEDIOII/FORMLID; (c3) SYSTEM/

KEYEDIOII/UTILITY; (c4) KIOII/FORMS/TRDESCRITTION.

The symbol files are designated as follows: (s1) SYMBOL/KEYEDIOII/FORMLID; (s2) SCREENDESIGN/KIOII/FORMS; (s3) SYMBOL/KEYEDIOII/UTILITY.

Installing KEYEDIOII

The first step in installation is to select a pack on which to load the SYSTEM/KEYEDIOII code file and then to initialize the KEYEDIOIISUPPORT function.

On first use of KEYEDIOII, the system creates a parameters file with default values on the same pack as the one with the SYSTEM/KEYEDIOII code file. The title of the parameters file is KEYEDIOII/CONTROL. This file contains run-time parameters for KEYEDIOII. These parameters affect the core usage, the audit check pointing and the ability to print run-time statistics.

The Master Control Program (MCP) initiates the KEYEDIOII libraries when the first KEYEDIOII file is opened.

KEYEDIOII Libraries

When the first KEYEDIOII file is created or accessed, then two KEYEDIOII library stacks are run. These are displays in the LIBRARY entries, as indicated below in Table L1.

TABLE L1

| Mix | Frz | Shr | Usr | 2 FROZEN LIBRARIES |
|---|---|---|---|---|
| 1234 | Perm | All | 1 SL | JOB *SYSTEM/KEYEDIOII |
| 1235 | Ctrl | All | 1 | KEYEDIOII/LIBRARY |

The user column shows a number of open KEYEDIOII files. The task 1235, which is the freeze control library, accepts AX (accept) messages to change the KEYEDIOII parameters previously mentioned.

To bring down the KEYEDIOII libraries, it is necessary to enter the ODT THAW command with either one of the library stacks. When the user count is zero (after all user programs have closed their KEYEDIOII files), the KEYEDIOII library tasks will end. The KEYEDIOII/LIBRARY checks to see if the THAW command has been executed. It does so once every minute or whenever the libraries EXCEPTION event is caused. Then the operator enters the HI (to cause the EXCEPTION event) ODD command after the THAW command to avoid waiting for up to one minute for the library to end.

In addition to the library stacks, SYSTEM/KEYEDIOII creates as many as four other stacks. Each of these stacks can accommodate up to 250 structures; two structures are allocated for each data file and a single structure for each index file. These stacks are active entries named KEYEDIOII/STRUCTURES nn, where nn is 00 for the first stack thru 03 for the fourth stack. These stacks become active one at a time when needed and remain active as long as the libraries are frozen. These stacks contain control information for each of the currently open KEYEDIOII files.

System Operations

There are certain file naming conventions and defaults used by KEYEDIOII, plus the creation and maintenance of file indexes and what is called COPY utility.

A KEYEDIOII file consists of one or more physical files. There is a data file containing the KEYEDIOII records and also an index file for each key or group of keys. The title of the data file is declared in the user program that creates, or reads, or updates the file.

By default, the index files have the same name as that of the data file, but /KEYnn is appended to the end of the file name. The variable nn in the index file name is the key number assigned at creation time. By default, the system creates index files on the same pack where the data file resides. As an example, if a user creates a program with a KEYEDIOII file which is entitled as a user-code (UC) ABC ON PACK that has three keys, then the system will create the following types of physical files:

(i) (UC) ABC ON PACK;
(ii) (UC) ABC/KEY01 ON PACK;
(iii) (UC) ABC/KEY02 ON PACK;
(iv) (UC) ABC/KEY03 ON PACK;

The system assigns the key number at the time that it creates the index. The key number remains permanently assigned as long as the index exists. If a user should delete (UC) ABC/KEY02, the other indices will still keep their same titles. If a programmer adds a new index, the system assigns an index number 2 to the new index because now "2" is the first available unassigned index number.

There are certain advantages for having separate physical files for the indexes. These include (a) the indexes can be relocated on different packs in order to balance the I/O paths; (b) indexes can be reconstructed from the data file if they become corrupted.

Relocating Index Files on Different Files

Block 0 of the data file (Table A-1) contains a directory of index file titles and pack locations. If a directory is empty, all the defaults are used. If a user wants to relocate index files on different packs, the user can use one of the following two methods to relocate the index files:

Method 1: Use the LIBRARY/MAINTENANCE function to copy the index file to the new pack and then remove the index file from the old pack. Then on a next execution of a user program that accesses the data file, the user will enter the ?FA command for the appropriate index file and pack name.

When the file is found, KEYEDIOII updates a directory in Block 0 of the data file (Table A-1) so that the index is found in the new pack the next time that the user program executes.

Method 2: Using the menu-driven function provided by the SYSTEM/KEYEDIOII/UTILITY program to relocate the indexes to different packs.

Utility Screens

The KEYEDIOII utility provides functions for adding, deleting, recreating, and moving index files and copying files. These KEYEDIOII utility functions are provided by the program SYSTEM/KEYEDIOII/UTILITY. The source file is named SYMBOL/KEYEDIOII/UTILITY. A user can call the utility as a library to programmatically invoke on-line functions.

Function Selection on Main Menu

The first screen that appears after a user invokes the utility is a menu that allows a user to select the activity the user wants to perform. The user can add, delete, recreate, or move an index for a KEYEDIOII file, or the user can copy various kinds of files. The user must enter a letter in the Function field and must name a source file for all options, except the final exit option of Quitting.

Accessing Files with Group Keys

In KEYEDIO, a one-to-one correspondence exists between the keys and the indexes, that is to say a single key field in the record provides an access to the KEYEDIO file. In KEYEDIOII, there is file access allowed by means of a group key. A group key is composed of multiple noncontiguous key fields in the records that are concatenated to form a group key for accessing files.

Locking Records

Locking records is an option in KEYEDIOII. By default, for compatibility with KEYEDIO, the records are not locked. Therefore, between the time when a record is being read and the time it is written, the record can be changed by another user of the file.

It is possible to enable record locking by assigning file attribute RECORDLEVELLOCK the value TRUE before opening a new KEYEDIOII file. After a file has been created with RECORDLEVELLOCK equal TRUE, the attribute becomes permanent. If a RECORDLEVELLOCK is enabled, the system enforces record locking when the file is opened for updating, that is for FILEUSE equals VALUE (IO). The system locks the record each time that the file is read. If the file is opened for enquiry, the system does not lock the records being read.

Subsequently the locked record can be freed by performing a certain series of tasks.

Performance and Usage

One factor is that of calculating the buffer size. The size of the buffer pool depends on the value of the ALLOWEDCORE parameter, which is controlled by the AX (accept) ODT command, which is a significant performance aspect of KEYEDIOII. The ALLOWEDCORE parameter represents the total buffer pool core available for all users of KEYEDIOII files. This parameter represents both a minimum and a maximum: it represents a minimum in that KEYEDIOII brings in additional blocks until ALLOWEDCORE is reached; it represents a maximum in that once the ALLOWEDCORE is reached, then the KEYEDIOII will tend to reuse the buffers.

If only one KEYEDIOII file is open, then KEYEDIOII might be able to bring the entire file into core, which would make access very fast. If more than one KEYEDIOII file is open, the ALLOWEDCORE is shared among the files so not as much of any one given file will fit in the ALLOWEDCORE. The buffers are reused, based on an algorithm that determines the least recently used buffer. Thus frequently access blocks tend to remain in core, and the less frequently used blocks are flushed out for new blocks.

The default value for ALLOWEDCORE is 50,000. As an example, one user site generally runs with 50 KEYEDIOII files open, and those 50 files have 200 users. That site runs with ALLOWEDCORE set at 200,000 words. The AX STATUS command will display the amount of ALLOWEDCORE actually in use. A quickly increasing FORCED OVERLAY count would indicate that the ALLOWEDCORE value is probably too small and that thrashing is occurring in the KEYEDIOII buffer pool.

Block Size Calculation

In general, it is useful to have small blocking factors for random accessing and large blocking factors for sequential accessing of files. A very important feature of KEYEDIOII is the ability to reblock when sequential accessing is detected. When the system detects physically sequential access (as opposed to KEYEDIO KEY sequential), then the KEYEDIOII automatically starts reading larger blocks. This process is called "reblocking ". Blocks up to 40 times the original block size, or approximately 3,000 words, whichever is smaller, are read into memory when physically sequential accessing is detected.

Generally, user-declared block sizes need not be large, because KEYEDIOII automatically adjusts them upward on sequential access. Block sizes normally should probably not exceed 1,000 words so that transfer time does not become a significant item on random I/O operations. A block size of about 500 words could be considered adequate.

As noted, when reblocking is in force, blocks are around 3,000 words in size. The only reason for declaring larger blocks is that population of the file is small enough that most of the file fits in ALLOWED CORE, and that most of the file is touched during a particular job. It is faster to search a small number of large blocks, than to search a large number of small blocks to see whether or not a particular block is in CORE.

Although the block sizes can be controlled by the users, KEYEDIOII still might override the user specification in certain ways, as follows: (a) the system adds one word of hidden data to each KEYEDIOII record so that KEYEDIOII attempts to re-adjust the block size in order to minimize wasted space; (b) block 0 of every KEYEDIOII file is reserved for control information, and KEYEDIOII reserves a minimum of 120 words for this information. (Thus, the user record "0" is actually the first record of block 1). Thus, the block sizes are always a minimum of 120 words.

Accessing Files with Relative Keys

When a KEYEDIO file is declared as "Indexed," the file can be accessed only through a user-declared index key (for example, an alpha field in the record). If the file is declared as INDEXNOTRESTRICTED, the file can be accessed either by the user-declared index key or a "relative key" (a numeric record number relative to record 0 in the file). Relative key accessing treats the file as though it were a flat file. In ALGOL, a Read statement of the form Read (F[RKEY], 30,A) means to read the record at the relative record RKEY of the file. With the earlier KEYEDIO files, there was some performance cost associated with files that are INDEXNOTRESTRICTED. Relative keys are put into a hidden index on the file similar to a user-declared index. Thus, adding a record to a file involves inserting a key into two indexsequential tables.

However, with KEYEDIOII, the ability to perform relative key accessing is essentially free. All KEYEDIOII files, even those declared as Indexed, are compatible with the relative key accessing programs, because a form of Data Management System II (DMSII) allows Direct data sets to be used for the KEYEDIOII files.

Unlike the prior KEYEDIO, the relative key order always corresponds to the physical record order in the file. Accessing in physical order is guaranteed in the KEYEDIO only when the file is originally created in user-key order and no keys have been added or deleted (since reused space causes new relative keys to be put into the middle of the file). Even then, however, cable blocks are mixed in with the data blocks.

As previously noted in "calculating the block size," the reblocking occurs with substantial performance gains when the system detects physically sequential access. In certain situations where the user wants to read all the records in the file in no particular order, then relative key accessing can be used to obtain performance gain.

When a file is opened, the index key of reference becomes the primary key (NRPG, it is the first key declared). When a file is read sequentially, the system returns records in the key of reference order. The key of reference can be altered by including a start statement in the program.

In ALGOL, the first sequence of code returns records in primary key order, which would probably not be in the physical order. There is a second sequence of code which returns records in physical order and will initiate reblocking.

In COBOL, relative key accessing is controlled by the Select clause. When the system reads the file, it returns records in physical sequential order. The system them updates RKEY to reflect what relative record is returned each time that the system sequentially reads the file. Deleted records are skipped. There are certain types of Select clauses in programs which allow random access to a file by using a relative key. RKEY is equal to the relative key value specified before the file is read.

In RPG (Report Program Generator), the file is declared as though it were a flat file, that is to say as a non-KEYEDIOII file that is accessed like any other disk file.

Running the System

The system writes records to the KEYEDIOII audit files under the following situations:

(a) Records are added to an existing KEYEDIOII file.
(b) Records are deleted from an existing KEYEDIOII file.
(c) Key changes are made to records of an existing KEYEDIOII file.
(d) A block that has been modified by some other program is encountered and the block has not yet been written back to disk.

The system does not write records to the KEYEDIOII audit files under the following situations:

(i) When a new file is created.
(ii) When a record of an existing file that does not affect the key field is updated. The data block is written back directly instead of being written to the audit file.
(iii) When a KEYEDIOII file has the file attribute NORECOVERY equals TRUE. This situation would normally be used by a batch program, where the file has been dumped prior to the execution. If a failure occurs, the system reloads the file and reruns the program.

Performance can be significantly improved by running the system without auditing. The system runs without auditing when NORECOVERY equals TRUE. Records are not written to the audit file, and multiple updates to the same block can take place and then they are written only once when the buffer is pushed out of ALLOWEDCORE or the file is closed.

If a file is updated when NORECOVERY equals TRUE, and if the Halt Load occurs before the file is closed, the file becomes unusable and must be reloaded after the Halt Load. Thus under the proper circumstances, NORECOVERY can be used to improve performance.

The present invention enables the user to analyze the condition of data files and index files of the specialized KEYEDIOII files so that subsequently the user would be able to initiate operations to restructure the KEYEDIOII files in a more efficient arrangement enabling faster access to the files and faster reading and writing of files.

SUMMARY OF THE INVENTION

The present invention provides a method involving means for analyzing data files in order to recognize when they are structured in an inefficient arrangement. This is done both for data file arrays and also for index file arrays.

The present invention relates to methods for analyzing specialized files designated as KEYEDIOII. The method provides a highly user-iterative tool which allows the user to analyze only those data files and index files that are of the specialized KEYEDIOII type.

If the file involved is of the KEYEDIOII type data file, then the methodology tool will analyze all blocks of the file. This makes it possible then to recognize when the files are structured in an inefficient arrangement.

Similarly, if the accessed file is of the index file type of KEYEDIOII, then the methodology tool scans through all the tables and analyzes each table.

Finally, the method tool outputs the analytical information onto a suitable output medium such as a screen or a printer. The output information displayed could be that of the following items:

(a) Name of the KEYEDIOII file;
(b) The file attributes, which include such items as:
    (i) File size;
    (ii) File location;
    (iii) Creation/modification with time/date information;
    (iv) Accessibility attributes.
        (i) Amount of data filled as a percentage of the file size;
        (ii) The depth of table level;
        (iii) An analysis of block levels such as the blocks as a percentage of the entire actual entries.

BRIEF DESCRIPTION OF THE DRAWINGS

FIG. 2A is an illustration of a data file which is unstructured;

FIG. 2B is an illustration of a data block showing the slots holding data which have been restructured;

GLOSSARY

Figure 1:
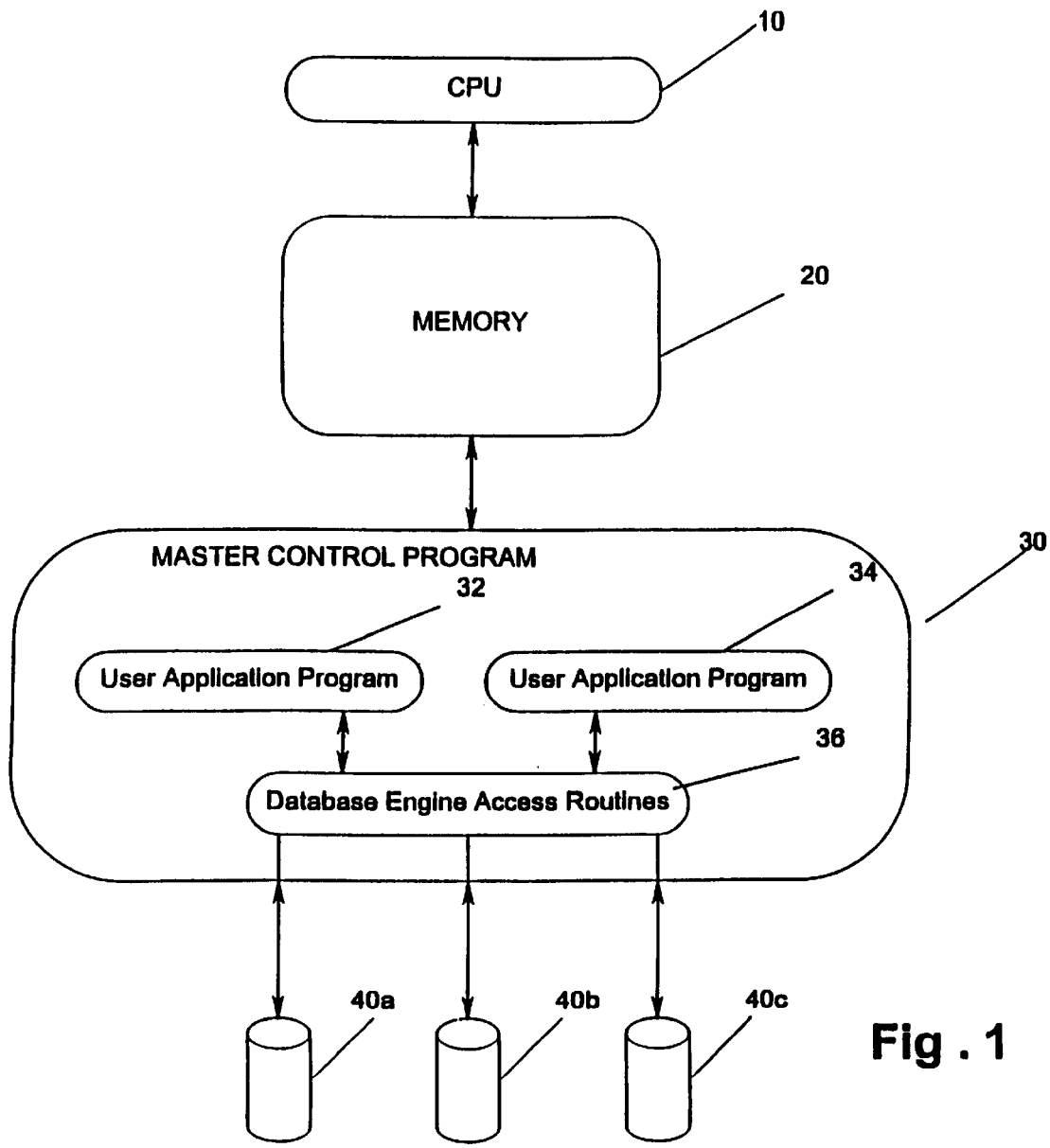
FIG. 1 is a generalized drawing showing the elements and environment in which the present system operates.

ACTION COMMAND: A control signal that moves the user from one screen to another or manipulates data on the screen.

ACTION FIELD: A field that appears on a screen and begins with the prompt "Action:". The user enters the desired action for execution between the indicators to the right of this prompt.

ACTION LINE: The location on a screen where the Action field appears.

ADDRESS: (1) The identification of a location in storage (memory). (2) A sequence of bits, a character, or a group of characters that identifies a network station or a group of stations, a user, or an application. (3) The location of a device in the system configuration.

ALLOWEDCORE: This is a term for indicating the maximum memory allowable for the system.

ALTERNATE RECORD KEY: A key, other than a prime record key, whose contents identify a record of an indexed file.

ARRAY: An ordered collection of a fixed number of common variables under one name.

B-TREE: This is a data structure used to store the key data which starts from a "root" named as a root-table, and then points to another level which is called a "coarse" table, and this eventually points to the lowest level which is named as a "fine table." The FINE table contains the real key information. The root and the coarse table only contains the pointers which point to one of the tables in a lower level. The keys in the tables are stored in a specific order which makes the search occur much more easily.

BALANCED TREE: This indicates that the allocation of keys in an index file are placed or allocated evenly within the tables involved.

BLOCKING FACTOR: The number of logical records stored in a physical record on disk or tape.

BLOCKSIZE: A file attribute that gives the length of a file block.

BOOLEAN: Pertaining to variables having a value of TRUE or FALSE.

BUFFER: An area in which data is stored temporarily.

BUFFER POOL: This is a portion of memory for keeping the data records which are shared by the data files/key files which have been opened in the KEYEDIOII system.

CANDE: See Command AND Edit.

CHECKPOINT: A place in a program where the program is to be stopped so that its current state can be written to disk. After the state of the program has been recorded, program execution resumes where it left off. If the system halts unexpectedly before the program finishes, the program can be restarted at its most recent checkpoint instead of at the beginning.

COBOL74: A version of the COBOL language that is compatible with the ANSIX3.23-1974 standard.

COMMAND AND EDIT (CANDE): A time-sharing Message Control System (MCS) that allows a user to create and edit files, and develop, test, and execute programs, interactively.

COMPILE-TIME OPTIONS: A set of options consisting of the two classes of options that can be set at compile time: compiler control options and compile-time default values and limit changes.

CONTROL FILE: This is a file which contains essential control information for the KEYEDIOII system. For example, this would indicate the maximum number of buffers that can be used or the maximum elements of memory which can be allocated and so on.

CORE: This is another term for memory in a computer system.

DATA MANAGEMENT SYSTEM II (DMSII): A specialized system software package used to describe a database and maintain the relationships among the data elements in the database. This system is described in a September 1977 Publication of Unisys Corporation, entitled "Getting Started With DMSII," Unisys Publication No. 8807 6625-000.

DMSII: See Data Management System II.

FILE NAME: (1) A unique identifier for a file, consisting of 1 to 14 name constants separated by slashes. Each name constant consists of 1 to 17 letters, digits, hyphens, and/or underscores. A file name can be optionally preceded by an asterisk (*) or usercode, and optionally followed by "ON" and a family name. (2) in RPG, a name that designates a set of data items. (3) In COBOL, a user-defined word that names a file described in a file description entry or a sort-merge file description entry within the FILE SECTION of the DATA DIVISION.

GARBAGE COLLECTION: In Data Management System II (DMSII), the process of consolidating deleted or unused space in data sets, sets, and subsets, and returning this space to the system.

GROUP KEY: This is a key which contains more then one key field.

HALT/LOAD: A system-initialization procedure that temporarily halts the system and loads the Master Control Program (MCP) from disk or pack to main memory.

HELP TEXT: Information displayed online when a user presses the specify (SPCFY) key or enters the HELP or TEACH command along with a keyword.

INDEX: This is a term which also indicates the key.

INDEX FILE: A file which contains the key and a pointer which points to a record of the data file. The index file is used to search for the data record based on a key value for efficient rapid access.

INDEXED ORGANIZATION: The permanent, logical file structure in which each record is identified by the value of one or more keys within that record.

INDEXED SEQUENTIAL ACCESS METHOD (ISAM): A method that provides efficient, flexible random access to records identified by keys stored in an index.

ISAM: See Indexed Sequential Access Method.

KEY: (1) A field used to locate or identify a record in an indexed file. (2) In COBOL, a data item that identifies the location of a record, or a group of data items that identifies the ordering of data. (3) In Data Management System II (DMSII), a field that serves as a retrieval key for a set or subset.

KEY FIELD: This is a portion of a data record which contains the key data.

KEYEDIOII: This is a software methodology designated as Unisys Indexed Sequential Access Method (ISAM) software for COBOL 74 and Report Program Generator (RPG) programming languages. It is based on DMSII (Data Management System II) so as to take advantage of the features of DMSII. KEYEDIOII is basically described in Unisys Corporation Publication 5044043.372 (1988).

KEY OF REFERENCE: In COBOL, the prime or alternate key currently being used to access records within an indexed file.

KIND: The file attribute that indicates the type of device on which the file is stored.

LABEL: (1) The first 28 sectors on a disk, on which information about the disk is stored. This information includes the family name and serial number, the Master Available Table (MAT), the family index number, information about the family's base pack, and a pointer to the system directory if the disk contains a directory. (2) In RPG and ALGOL, a name that identifies either a point in the Calculation Specifications where a GOTO operation branches or the beginning of a subroutine.

LIBRARY: (1) A collection of one or more named routines or entry points that are stored in a file and can be called by other programs. (2) A program that exports objects for use by user programs.

LIBRARY DIRECTORY: A memory structure associated with a library process stack that describes the objects exported by the library process.

LIBRARY PROCESS: An instance of the execution of a library. The sharing option of a library determines whether multiple user programs use the same instance of the library.

MAJOR KEY: The first key in a complex key.

MINOR KEY: Any key in a complex key that is not the major (first) key.

NIX: The set of processes that currently exist on a particular computer. The mix can include active, scheduled, and suspended processes.

MIX NUMBER: A 4-digit number that identifies a process while it is executing. This number is stored in the MIX-NUMBER task attribute.

ODT: See Operator Display Terminal.

OPERATOR DISPLAY TERMINAL (ODT): (1) A System Control Terminal (SCT) configured for direct communication with the operating system. The ODT is used primarily by operations personnel for entering commands that control and direct the system and its resources. (2) The name given to the System Control Terminal (SCT) when it is used as an ODT.

PACK NAME: This is a term to indicate the name of a disk or disk volume.

PARAMETER: (1) A quantity or item of information that can be given a different value each time a process is repeated. (2) An identifier associated in a special way with a procedure. A parameter is declared in the procedure heading and is automatically assigned a value when the procedure is invoked. (3) An object or value that is passed from an actual parameter and received by a formal parameter. (4) Any value passed to a program by the user or by another program in order to customize the program for a particular purpose. A parameter may be anything, for example, a file name, a coordinate, a range of values, a money amount or code of some kind. Parameters may be required as in parameter-driven software or they may be optional. Parameters are often entered as a series of values following the program name when the program is loaded. (5) In programming, a value passed to a sub-routine or function for processing.

PRIME RECORD KEY: A key with contents that identify a record in an indexed file.

PROCEDURE: (1) A block that can be invoked by statements elsewhere in the same program or, in some cases, by statements in another program. In most cases, a procedure has a procedure heading and a procedure body. Examples are a procedure in ALGOL, a procedure or function in PASCAL, a subroutine or function in FORTRAN, or a complete COBOL program. (2) In COBOL, a paragraph or group of logically successive paragraphs, or a section or group of logically successive sections, within the PROCEDURE DIVISION.

REBLOCK: This is a term indicating the reading in of data in multiples of the block size which has been defined for a particular file.

RECORD KEY: A key, either the prime record key or an alternate record key, with contents that identify a record within an indexed file.

RESULT DESCRIPTOR: A 48-bit word that is the standard Data Management System II (DMSII) exception word. A result descriptor includes the exception category and subcategory, and the structure number involved. When an exception occurs, the last bit in the 48-bit word is set to 1. When an operation is successful, the 48-bit word contains all zeros.

RPG: Report Program Generator: A high-level, commercially oriented programming language used most frequently to produce reports based on information derived from data files.

SUPPORT LIBRARY: A library that is associated with a function name. User programs can access a support library by way of its function name instead of its code file title. The operator uses the SL (Support Library) Operator Display Terminal (ODT) command to link function names with libraries.

SYMBOLIC FILE: A file that contains a source program.

TABLE: A unit index file to hold a set of keys in ascending or descending order.

THRASHING: This is a term to indicate that the very same data is brought into and out of a memory space very frequently.

TREE: A data structure containing zero or more nodes that are linked together in a hierarchical fashion. If there are nodes, then one node is the root and each node beyond the root is the child of one and only one other node; each node has zero or more nodes as its children.

TREE SEARCH: A search procedure performed on a tree data structure. At each step of the search, the tree search is able to determine, by the value in a particular node, which branches of the tree to eliminate, without searching those branches themselves.

DESCRIPTION OF PREFERRED EMBODIMENT

The present system for improving the operating efficiency of a data management system involves various processes which will analyze specialized data files and index files and, in addition, will display the condition of these files so that the user can operate in a faster and much more efficient manner.

The environment in which the present embodiment operates is indicated in FIG. 1. Here, a central processing unit 10 works in conjunction with a memory 20 which connects to the Master Control Program 30.

The Master Control Program 30 will be seen to have a number of user application programs, such as 32 and 34 which connect to a database engine 36. The database engine 36 has access routines which enable communication for reading and writing to occur between a set of database file structures, such as disk volumes 40a, 40b, and 40c.

Now referring to FIG. 2A, there is an illustration of different status conditions for data blocks. For example, FIG. 2A is an illustration of an unstructured data block showing various files in slots wherein certain slots have data residing in them and other slots have been deleted of their data and have nothing residing in them resulting in what is called an unstructured file.

FIG. 2B is an example of a data block which can be considered as a "restructured" file in which there has been eliminated all of the deleted slots and into which there have been placed data so that the various slots in the restructured data block file will all have data in them thus making the data more easily available for reading and writing purposes, since there is no longer any need to waste time passing over and checking deleted data slots.

Figure 3A:
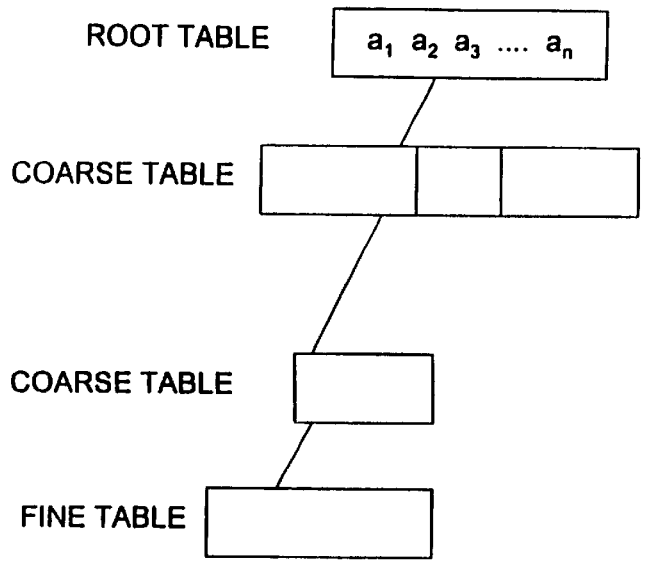
FIG. 3A is a drawing showing how an index file can develop into an unbalanced B-tree basis.

FIG. 3A shows an example of an index file which has been functioning in an unbalanced B-tree arrangement. Here the root table, having indices a1, a2, a3, . . . n is then operatively connected to a coarse table which subsequently has another coarse table to which it is connected and finally the coarse table is connected to a Fine table. As a result the "unstructured" index file will have many levels of coarse tables and many empty slots in the Fine tables.

Figure 3B:
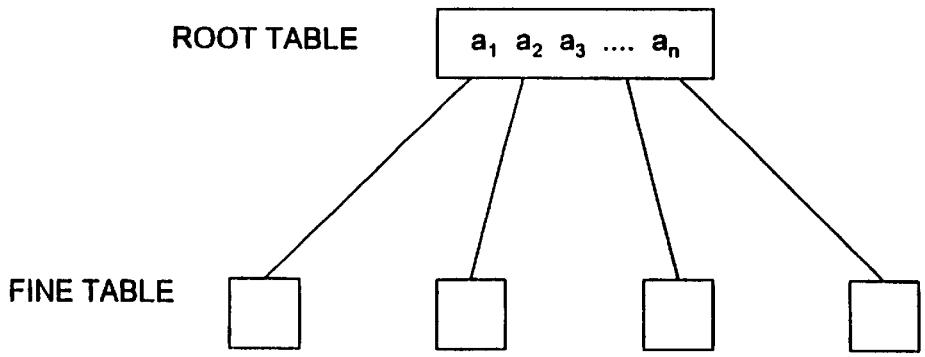
FIG. 3B is a drawing showing how the index file can be restructured after analysis in order to provide a balanced and more easily accessible index file.

Now referring to FIG. 3B, there is seen an indexed file which has been restructured into a balanced tree. This can be done after the user has performed an analysis operation described later herein. Here the root table having indices a1, a2, a3, . . . an, is directly organized to access a set of Fine tables on a balanced basis which provides a rapid quick and direct access for the index. Thus the balanced index file, when restructured, will eliminate the coarse tables and eventually distribute the Fine tables on an easily accessible balanced basis.

The data file is basically an array of slots, so that during the course of operations there are certain slots which have data and certain slots which do not have data, that is they have been deleted (FIG. 3A), so this leaves a jumble of used and unused slots in the data file array, which makes a very inefficient situation for access and retrieval.

Thus, the object here is to analyze the file structures so that the user can restructure or reorganize the data file so that each of the slots in sequence will hold data, and the structure no longer has an interspersal of deleted slots between the various used data slots.

In regard to the "collection" of data on the KEYEDIOII file, the system works as follows:
  a) The Data file: The information collected shows the percentage of deleted slots in the file and the available spaces in the file.
  b) Index file: This collected information shows the number of B tree levels. The index files are set up in a tree structure, which is called the B-tree. This involves a root table having various indices, such as a1, a2, a3, a4, ... an.

Then each one of these indexes, such as a1, a2, etc. leads off as a branch to a Coarse table. Then each branch of the Coarse table leads to another branch of the Coarse table, and this Coarse table leads to another branch of the Coarse table, and this Coarse table leads to another branch called the Fine table.

When there occurs an "unstructured" index file, there are then many levels of the Coarse table and many empty slots in the Fine tables. This is an example of an indexed file developed as an unbalanced B-tree, as seen in FIG. 3A.

After performing the analysis provided in the present invention, then the user can initiate other programs for restructuring of the index file to form a balanced tree. In this case, the Root Table will have equal legs showing the Fine tables which are balanced on either side of the center of the Root table, as seen in FIG. 3B.

Figure 4A:
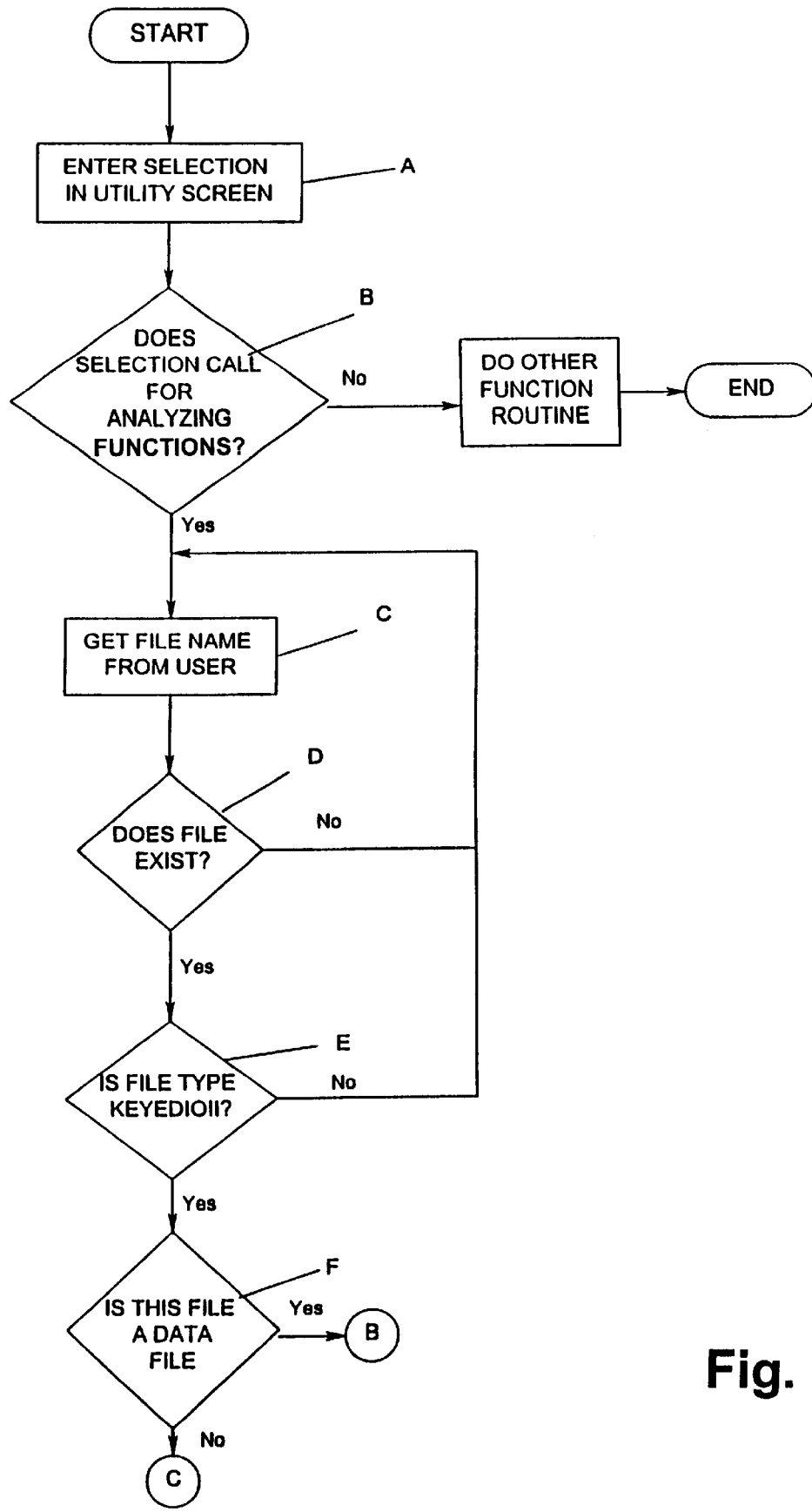
FIG. 4A is a flow chart showing the steps involved in determining whether the access file is a data file or an index file.
Figure 4B:
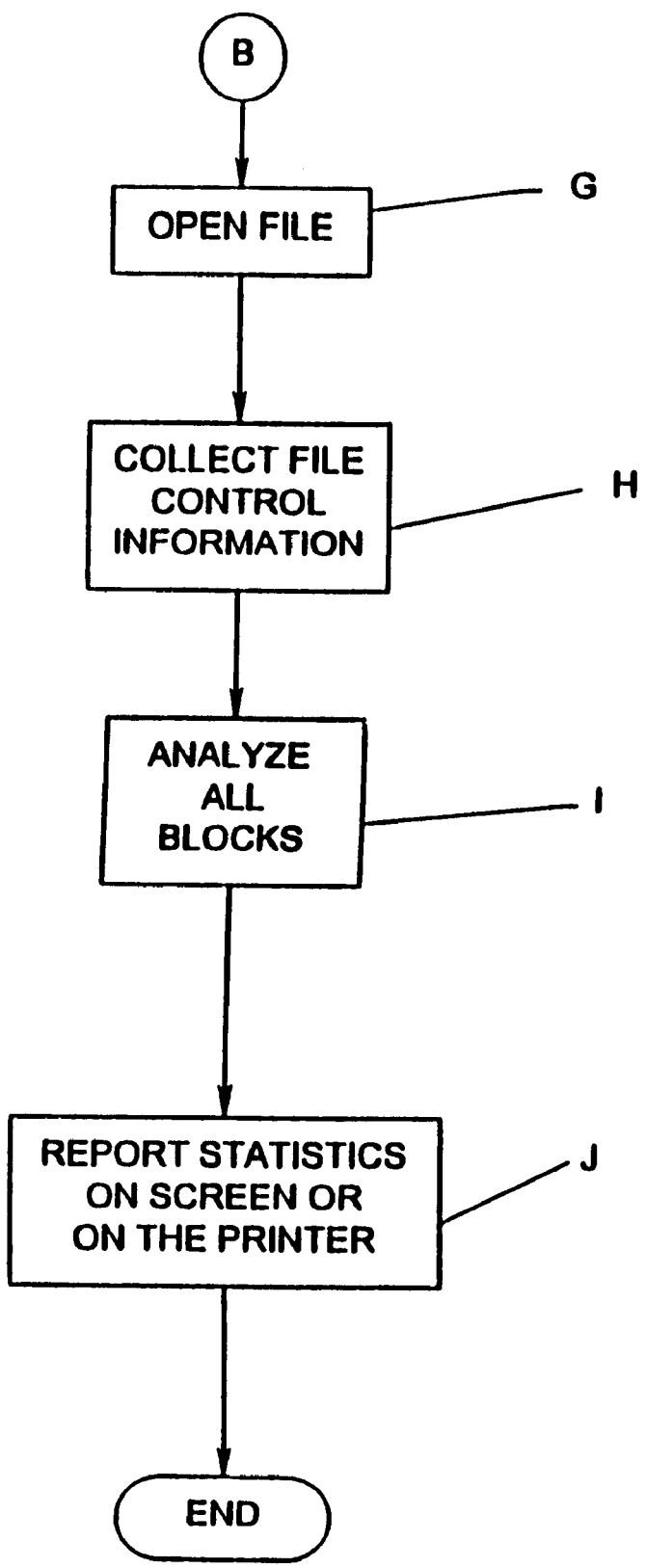
FIG. 4B is a flow chart showing the set of steps involved in analyzing the blocks of data files.
Figure 4C:
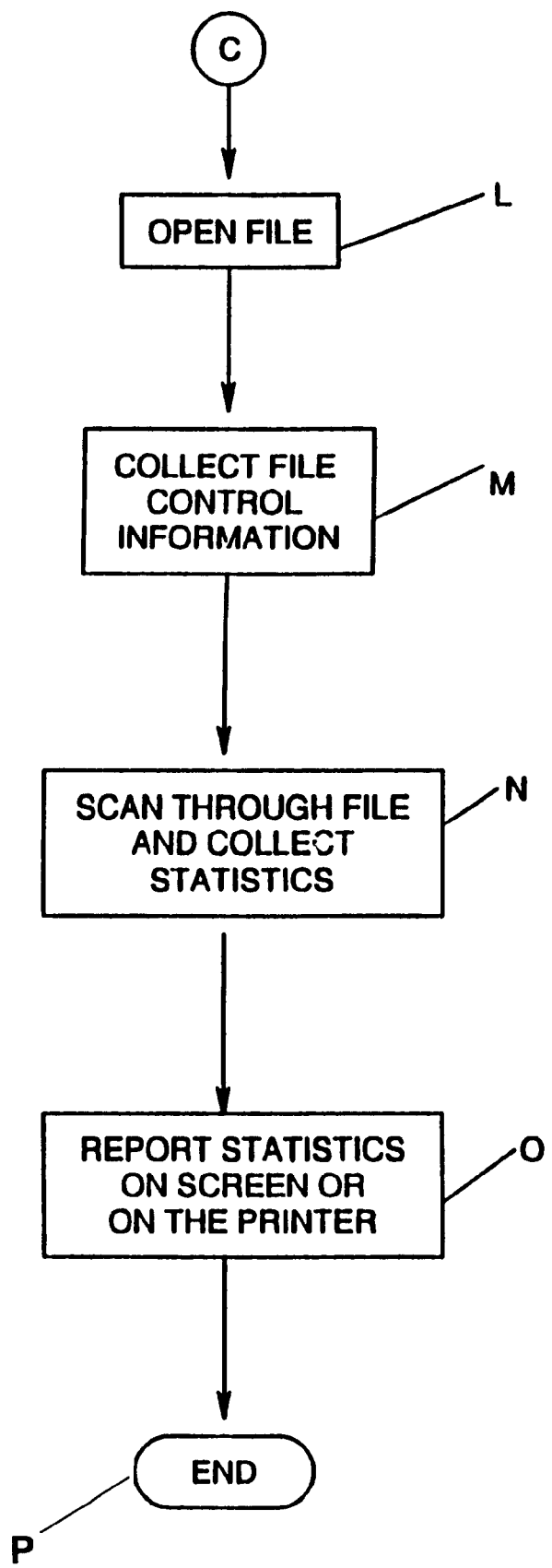
FIG. 4C is a flow chart showing the sequential steps involved in analyzing the index file.

The sequence for enabling analysis of the data files and index files is shown by the flow charts of FIGS. 4A, 4B, and 4C.

Regarding the flow charts, starting with FIG. 4A, the first step, designated step A, involves the operator-user regarding a menu on the utilities screen in which the user-operator selects a particular item.

Then at step B, a decision block occurs as to whether the selection calls for analyzing the functions of the items selected.

At step C, the user enters the file name of the particular file to be investigated or analyzed.

At step D, a decision block exists to find whether that particular file exists or not. If not (no), then the sequence returns back to step C.

At step D if the file does exist (yes), then at step E a decision block occurs to find out whether this file type exists in the KEYEDIOII system.

If this is the case (yes), then at step F a decision block requires the answer as to whether the file is a data file. If the answer is yes, then the sequence proceeds to reference mark B on FIG. 4B Now referring to FIG. 4B, the step F (yes), mark B operates then to step G, which is the action of opening the particular file involved.

Then at step H, the system will collect the control information required (as shown in Table A1 and A2), such as finding out the block size.

Then at step I, the program will analyze all of these blocks in order to determine the percentage of blocks filled with data.

Then at step J, the statistics involved, which is the percentage of data in the file, will be reported on the screen or on the printer.

Returning to step F of FIG. 4A, if the file is not a data file (no), the procedure goes on to reference mark C on FIG. 4C. Thus, if the file is not a data file, it then must indicate that it is an index file. At this stage, which is step L, the index file is opened. Then at step N, there is a collection made of the file control information (as shown in Table B1) as to the size of the Root Table, the Coarse Table, and the Fine Tables of the index file, the length of the keys and whether the keys are in ascending or descending order.

At step N, the system will scan through the file and then at step O it will report the statistics on the screen or on the printer, and the sequence will end at step P.

As previously noted, the control information can be seen in Table A-1 and A-2, which is the control information for the data file.

Table B-1 is the control information for the index files.

With reference to step O where the system reports statistics about the status of file utilization, there are certain factors which can be displayed on the screen or printer. These include:
  (i) There will be a percentage figure to show the amount of data blocks that are filled as a percentage of the overall file size. For example, if the file size involves a million words, then a 70% figure would indicate that 700,000 words are filled and 300,000 word blanks are still available for usage.
  (ii) In regard to the analysis of depth of the table level for index files, this would be displayed as certain numbers such as 1, 2, 3, ... up to N, which would be the depth of that particular table. The display would indicate some fraction, such as 2 over 10 (2/10), where 10 would be the highest possible level and 2 would be the current level.
  (iii) In regard to the analysis of block levels which show the blocks as a percentage of the entire actual entries, here, for example, if there were 100 words in a block but only 30 words were utilized, then this would indicate the figure of 30%.

Described herein is a system and method for analyzing and reporting on the conditional status of a specialized file data management system which enables a user to analyze and observe a display of the current conditions of the data files and the index files. This provides vital information to the user so that the user, when necessary, can then subsequently invoke correctional methods to restructure the data and index files into a more efficient set of conditions which increase the speed and efficiency of Reading and Writing operations.

While other methods may possibly be instituted or arranged for analyzing the status of these specialized file conditions, the present method is encompassed by the following claims.

What is claimed is:

1. In a computer system executing a master control program and having a central processing unit and main memory, a method, enabled by a user, for analyzing a specialized type of data and index files, comprising the steps of:
  (a) entering, by said user, a file name of a selected data or index file;
  (b) checking said file name to determine whether the file is a data file or an index file;
  (c) opening the file after indicating whether it was a data or an index file;
  (d) collecting control information regarding said file which was recognized;
  (e) scanning through the collected statistics of that file if that file is an index file;
  (f) Analyzing each one of all data blocks if said file is a data file; and (g) Displaying said analysis and/or collected statistics via a screen or a printing module; which includes the step of:
   (g1) displaying the percentage of data blocks of said selected data file which are filled as a portion of the totally available blocks.

2. The method of claim 1 wherein said data and index files are specialized files of a data management system designated KEYEDIOII.

3. In a computer system executing a master control program and having a central processing unit and main memory, a method, available to a user, for analyzing selected data files of a specialized data management system, said method comprising the steps of:
   (a) Entering a file name, by said user, of said selected data file;
   (b) Verifying if said file name is actually a data file having data blocks rather than an index file;
   (c) Opening up said selected data file once it is verified as a data file;
   (d) Collecting control information on said data file;
   (e) Analyzing each one of all of the data blocks of said selected data file; and
   (f) Displaying, via a screen or a printer, an analysis of the utilization status of said data blocks in said selected data file which includes the step of:
      (f1) displaying the percentage of data of said selected data file which indicates the number of utilized blocks in relation to the total number of blocks available for said selected data file.

4. The method of claim 3 wherein step (a) includes:
   (a1) entering the file name of said selected data file from a specialized data management system designated KEYEDIOII.

5. The method of claim 3 wherein step (d) includes the step of:
   (d1) collecting the record length in words;
   (d2) finding the block size in words;
   (d3) finding the number of user records.

6. In a computer system executing a master control program and having a central processing unit and main memory, a method for analyzing index files of a specialized data management system, said method comprising the steps of:
   (a) entering a selected file name of an index file of said data management system;
   (b) verifying that a file name is an index file rather than a data file;
   (c) opening up said index file;
   (d) collecting control information regarding said index file;
      (d2) finding the sequence of course tables, having series of indexes, and their fine, table correspondences
   (e) scanning through a collected set of statistics of said verified index file; and
   (f) displaying, via a screen or printer, of said collected statistics of said index file which includes the step of:
      (f1) displaying the number of coarse tables and their associated fine tables for a selected index file.

7. The method of claim 8 wherein step (a) includes the step of:
   (a1) entering a selected file name for a specialized file designated KEYEDIOII.

\* \* \* \* \*